United States Patent
Jenness et al.

(10) Patent No.: US 10,125,869 B2
(45) Date of Patent: Nov. 13, 2018

(54) PISTON RING FOR AN INTERNAL COMBUSTION ENGINE

(71) Applicant: Federal-Mogul Corporation, Southfield, MI (US)

(72) Inventors: Blair Matthew Jenness, Grosse Pointe Park, MI (US); Matthew Ryan Pedigo, Howell, MI (US); Troy Kantola, Whitmore Lake, MI (US)

(73) Assignee: Tenneco Inc., Lake Forest, IL (US)

( * ) Notice: Subject to any disclaimer, the term of this patent is extended or adjusted under 35 U.S.C. 154(b) by 583 days.

(21) Appl. No.: 13/768,196

(22) Filed: Feb. 15, 2013

(65) Prior Publication Data
US 2013/0213219 A1 Aug. 22, 2013

Related U.S. Application Data

(60) Provisional application No. 61/600,329, filed on Feb. 17, 2012.

(51) Int. Cl.
*F16J 9/20* (2006.01)
*F16J 9/06* (2006.01)
*F02F 1/18* (2006.01)

(52) U.S. Cl.
CPC .............. *F16J 9/062* (2013.01); *F02F 1/18* (2013.01); *F16J 9/06* (2013.01); *F16J 9/206* (2013.01)

(58) Field of Classification Search
CPC ..................................... F16J 9/06; F16J 9/206
See application file for complete search history.

(56) References Cited

U.S. PATENT DOCUMENTS

| 580,090 | A | 4/1897 | Lewis |
| 945,233 | A | 1/1910 | Hatch |
| 1,015,502 | A | 1/1912 | Meaker |
| 1,218,132 | A | 3/1917 | Tuhey |

(Continued)

FOREIGN PATENT DOCUMENTS

| CN | 1374445 A | 10/2002 |
| CN | 200961532 Y | 10/2007 |

(Continued)

OTHER PUBLICATIONS

International Search Report, dated Jun. 20, 2013 (PCT/US2013/026275).

*Primary Examiner* — F. Daniel Lopez
(74) *Attorney, Agent, or Firm* — Robert L. Stearns; Dickinson Wright, PLLC

(57) ABSTRACT

A power cylinder assembly for an internal combustion engine is provided. The power cylinder assembly includes a cylinder wall having a channel formed therein and a piston body with a skirt. A piston ring is seated within the channel of the cylinder wall and is sealed against the skirt of the piston body. Specifically, the piston ring has a ring body with an inner face that presents two radially inwardly extending ridges spaced axially from one another by a valley region, and the outer face presents a groove which receives a spring to bias the ridges into sliding engagement with the outer surface of the skirt of the piston body. The ring body also has at least one oil drainage port which extends radially between the valley region of the inner surface and the groove of the outer face for conveying oil from between the ridges into the groove.

4 Claims, 5 Drawing Sheets

(56) References Cited

U.S. PATENT DOCUMENTS

| | | |
|---|---|---|
| 1,436,130 A | 11/1922 | Webb |
| 1,682,130 A | 1/1926 | Johnston |
| 1,871,820 A | 8/1932 | Morton |
| 1,959,769 A | 5/1934 | Simmen |
| 2,426,613 A | 8/1945 | Jackson |
| 2,514,016 A | 7/1950 | Casado |
| 2,614,899 A * | 10/1952 | Phillips ............... F16J 9/063 277/444 |
| 3,548,721 A | 12/1970 | Eisennegger |
| 3,777,722 A | 12/1973 | Lenger |
| 4,247,972 A * | 2/1981 | Hendrixon ............ B23P 15/08 219/121.85 |
| 4,681,327 A * | 7/1987 | d'Agostino et al. .......... 277/587 |
| 5,066,027 A * | 11/1991 | Edlund ................ F16J 15/32 277/552 |
| 6,675,762 B2 * | 1/2004 | Han ........................ 123/193.6 |
| 7,354,045 B2 * | 4/2008 | Abe ..................... F16J 9/062 277/435 |
| 7,735,834 B2 | 6/2010 | Hofbauer |
| 2010/0319661 A1 * | 12/2010 | Klyza ................... F02B 75/28 123/51 R |
| 2010/0326391 A1 | 12/2010 | Mierisch et al. |
| 2012/0112418 A1 * | 5/2012 | Rabute ................. F16J 9/062 277/460 |
| 2013/0049305 A1 | 2/2013 | Miyamoto et al. |

FOREIGN PATENT DOCUMENTS

| | | |
|---|---|---|
| CN | 201103490 Y | 8/2008 |
| CN | 101929405 A | 12/2010 |
| CN | 201875119 U | 6/2011 |
| CN | 102352800 A | 2/2012 |
| CN | 202228205 U | 5/2012 |
| CN | 102859241 A | 1/2013 |
| CN | 102900560 A | 1/2013 |
| FR | 2030083 A1 | 10/1970 |
| GB | 345313 A | 3/1931 |
| GB | 1265967 A | 3/1972 |
| JP | S49012724 B1 | 3/1974 |
| JP | S61038266 A | 2/1986 |
| JP | 2006125530 A | 5/2006 |
| WO | 03044400 A1 | 5/2003 |
| WO | 2011072063 A1 | 6/2011 |

* cited by examiner

PISTON RING FOR AN INTERNAL COMBUSTION ENGINE

CROSS REFERENCE TO RELATED APPLICATION

This application claims the benefit of application Ser. No. 61/600,329 filed Feb. 17, 2012.

BACKGROUND OF THE INVENTION

1. Field of the Invention

The present invention relates generally to internal combustion engines having at least one reciprocating piston within a cylinder, and more particularly to seals between the reciprocating piston and a cylinder wall.

2. Related Art

Typical internal combustion engines are provided with at least one piston body which reciprocates within a cylinder of an engine block. In general, each piston body includes a plurality of ring grooves, each of which receives and operably supports a piston ring. In operation, the piston rings remain in the ring grooves and travel with their respective piston bodies in a reciprocating motion within cylinders of an engine block. Among other things, the pistons rings function to seal combustion gasses in a combustion chamber above the piston body, to transfer heat from the piston body to the cylinder wall, to restrict the passage of oil from the crank case to the combustion chamber and to provide a generally uniform oil film on the cylinder wall. Such piston rings are typically biased with a spring force in a radially outward direction against the cylinder wall to establish the seal between the piston body and the cylinder wall.

SUMMARY OF THE INVENTION

According to an aspect of the present invention, a piston ring for sealing a cylinder wall to a piston body is provided. The piston ring includes a ring body which extends about an axis and has an inner face and an outer face. The inner face presents at least two ridges that extend in a radially inward direction with the ridges being spaced axially from one another by a valley region. The outer face of the ring body presents a groove, and a spring is seated in the groove. The spring substantially circumferentially surrounds the ring body and biases the ring body in the radially inward direction for sealing the ridges on the inner face against the piston body. The ring body also has at least one oil drainage port which extends radially between the valley region of the inner face and the groove on the outer surface for conveying oil out of the space between the ridges to the groove.

The piston ring may be seated in a channel of a cylinder wall and sealed against the skirt of a piston body. As such, the piston ring remains generally stationary and does not move relative to the cylinder wall during operation of the engine. This location allows for increased stability of the piston body as it reciprocates in the cylinder of the engine without compromising the length of the skirt, i.e. the skirt may extend downwardly past the cylinder wall when the piston body is in a bottom dead center position. The piston ring also is resistant to blow by and has drainage ports for conveying oil out of the space between the ridges.

Another aspect of the present invention provides for a power cylinder assembly. The power cylinder assembly includes a cylinder wall that has a channel formed therein, and the channel extends circumferentially around the cylinder wall. The power cylinder assembly also includes a piston body having a skirt, and at least a portion of the skirt has an outer surface which extends continuously around a circumference. A piston ring is disposed in the channel of the cylinder wall, and the piston ring has a ring body which extends about an axis and has an inner face and an outer face. The inner face has at least two ridges which extend in a radially inward direction. The ridges are spaced from one another by a valley region, and the outer face of the ring body presents a groove. The piston ring further includes a spring which substantially circumferentially surrounds the ring body and is seated in the groove on the outer face. The spring biases the ring body in the radially inward direction to seal the ridges against the circumferentially continuous portion of the skirt of the piston body. The ring body also has at least one oil drainage port which extends radially between the valley region of the inner face and the groove of the outer face for conveying oil from between the ridges to the groove.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
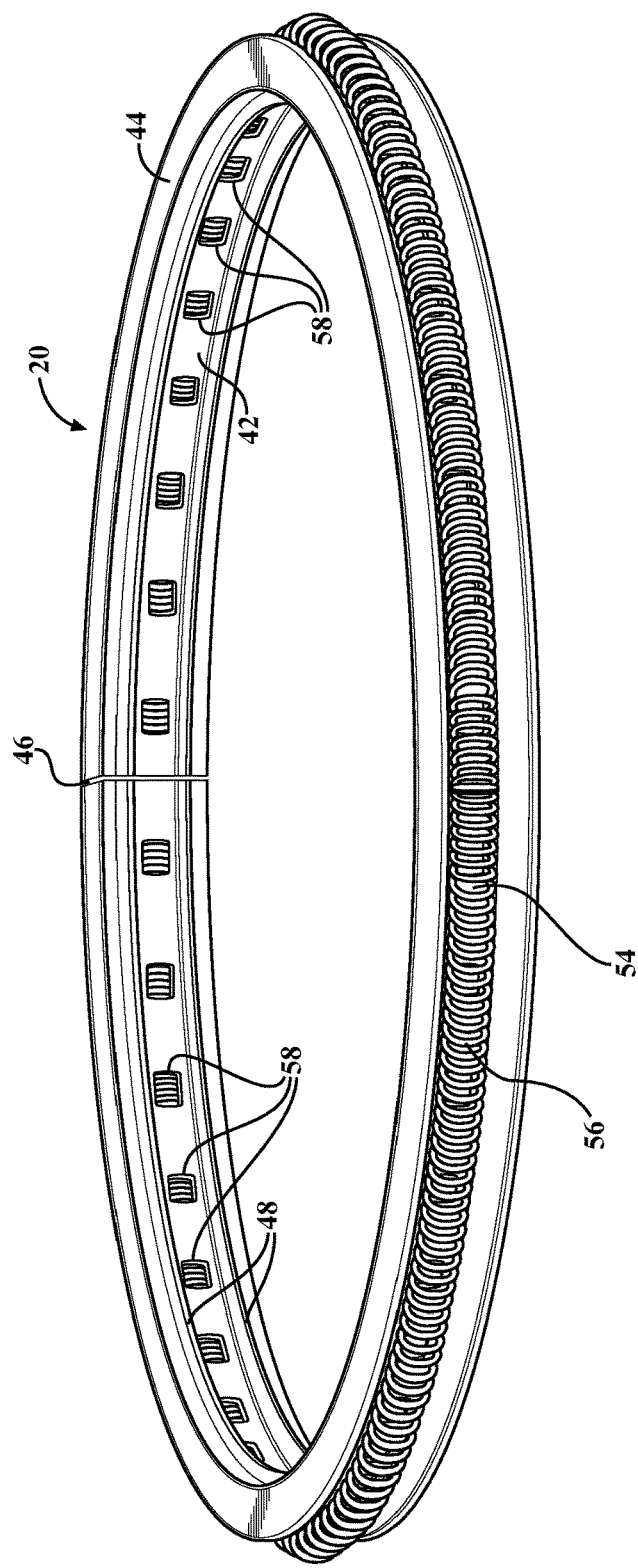
FIG. 1 is a perspective and elevation view of an exemplary embodiment of a piston ring.

Referring to the Figures, wherein like numerals indicate corresponding parts throughout the several views, an exemplary embodiment of a piston ring 20 for sealing a piston body 22 to a cylinder wall 24 of a power cylinder assembly 26 of an internal combustion engine is generally shown in FIG. 1. Referring now to the cross-sectional views of FIGS. 2 and 3, the exemplary piston ring 20 is shown as installed in a power cylinder assembly 26 of an internal combustion engine having an engine block 28 and a two-piece cylinder liner 30 which together present an axially extending cylinder wall 24 having a channel 32 that extends substantially circumferentially around the cylinder wall 24. Specifically, in the exemplary embodiment, the piston ring 20 is disposed between ends of the cylinder liner 30 pieces which are spaced axially from one another to present the aforementioned channel 32. However, it should be appreciated that the channel 32 could be formed into the cylinder wall 24 through a range of different manners. For example, the channel 32 could be formed directly into the engine block 28 without any cylinder liner 30. The exemplary piston ring 20 is shown installed in a diesel fueled compression ignition engine; however, it should be appreciated that the piston ring 20 could alternately be used in a range of different types of internal combustion engines including, for example, spark ignition engines or horizontally opposed two piston per cylinder engines.

Figure 2:
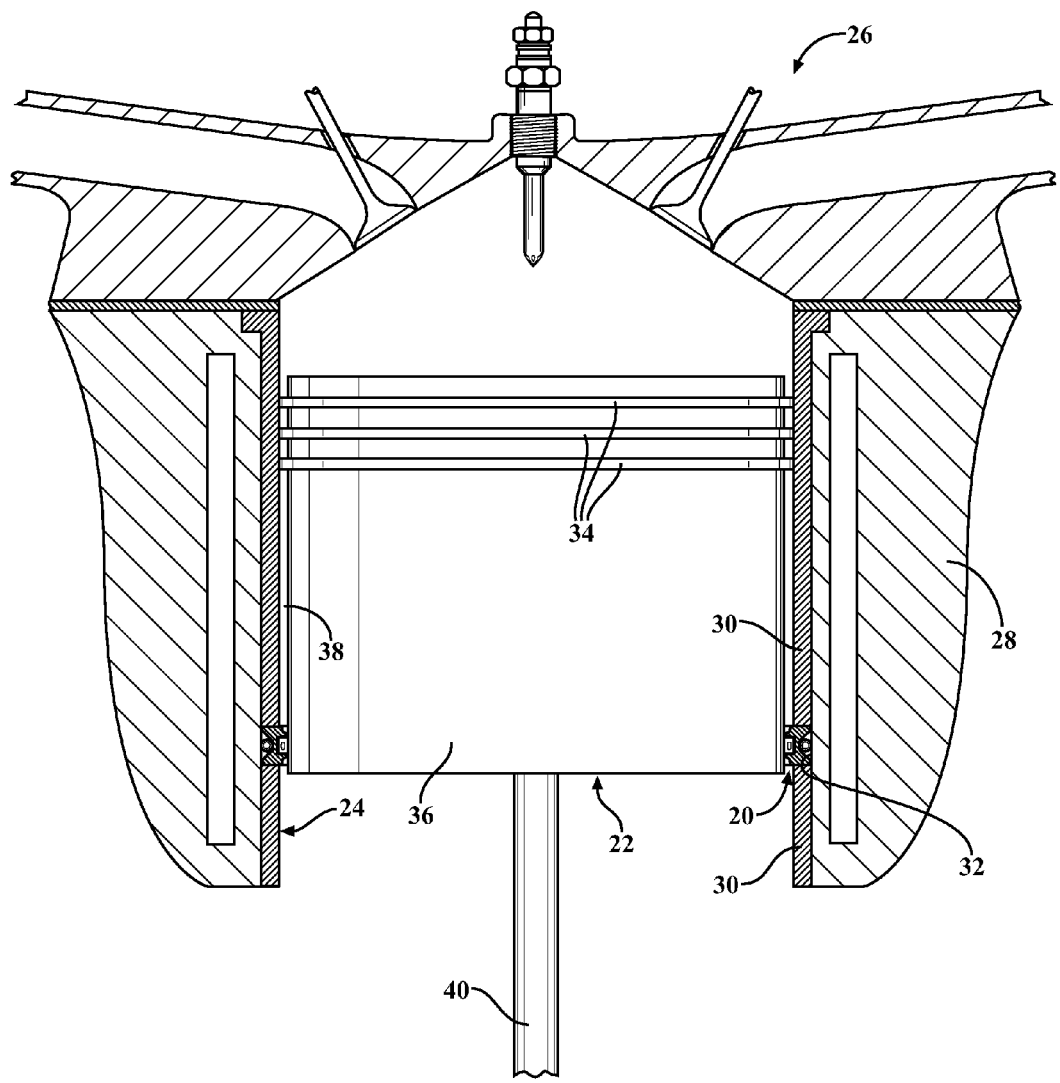
FIG. 2 is a sectional view of an exemplary embodiment of a power cylinder assembly and including the piston ring of FIG. 1 and showing a piston body in a top dead center position.
Figure 3:
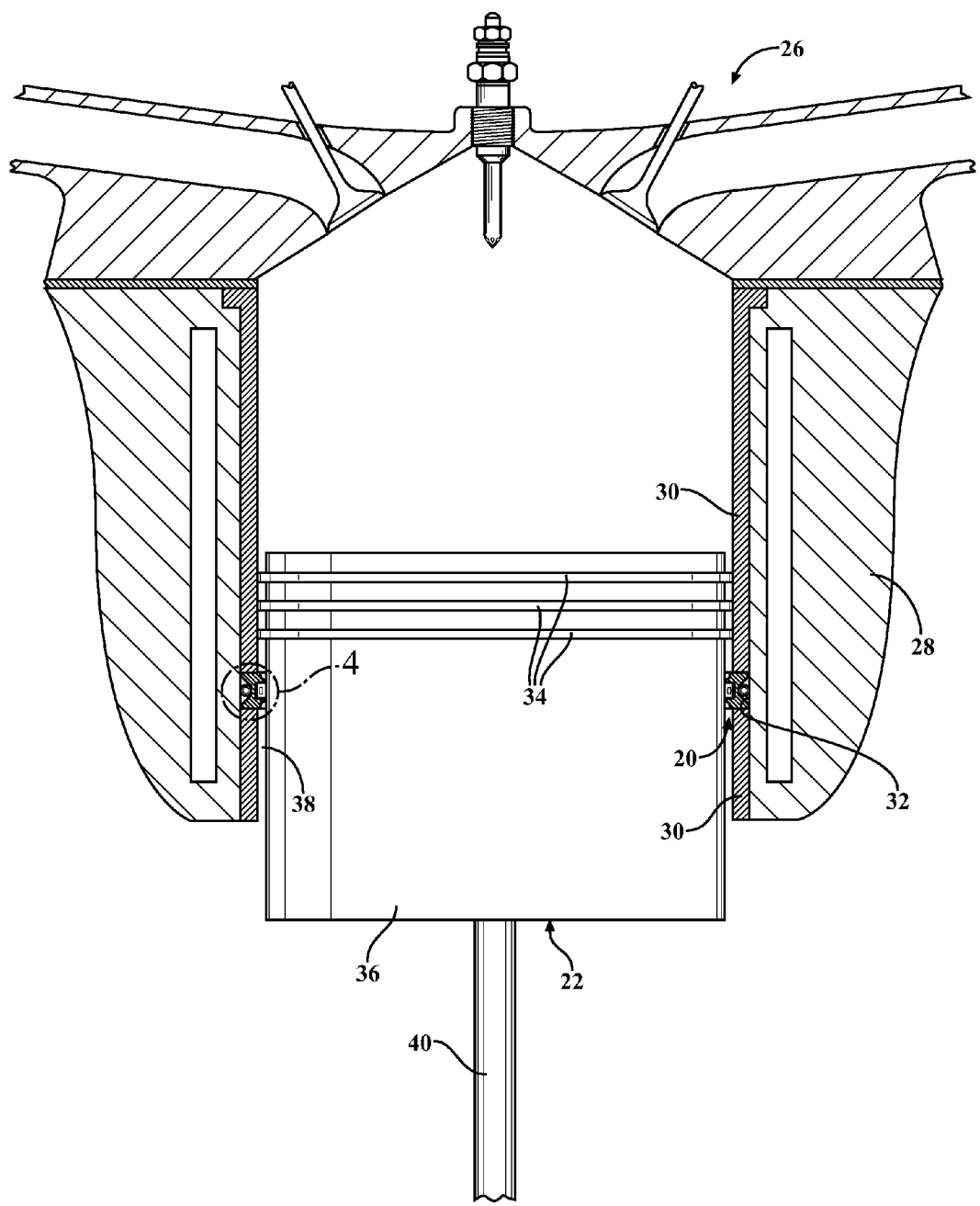
FIG. 3 is another sectional view of the exemplary embodiment of the power cylinder assembly with the piston ring of FIG. 1 and showing the piston body in a bottom dead center position.

Referring still to FIGS. 2 and 3, the piston body 22 of the exemplary power cylinder assembly 26 includes one or more upper piston rings 34 (a plurality being illustrated in the exemplary embodiment) which are carried in associated ring grooves formed in the outer wall of the piston body 22. The piston body 22 also has a skirt 36 which depends from the piston ring 20 region and helps guide the piston body 22 during reciprocation within the cylinder during operation of the engine. At least a portion of the skirt 36 is generally cylindrically-shaped and has an outer surface which extends continuously around a circumference. This portion of the skirt 36 is sized to be close to but relatively smaller than the inner diameter of the cylinder wall 24 such that there is an operating gap 38 therebetween. The piston body 22 is coupled by a wrist pin (not shown) or a similar type of connection device to a connecting rod 40, which in turn is coupled to a crank shaft (not shown) or a similar mechanism.

Referring still to FIGS. 2 and 3, in its location in the channel 32 of the cylinder wall 24, the exemplary piston ring 20 is mounted stationarily relative to the engine block 28 and is sealed against the outer surface of the skirt 36 of the piston body 22 to establish a gas and fluid tight seal between the cylinder wall 24 and the piston body 22. The piston ring 20 has an inner face 42 (best shown in FIG. 4) that is in running contact with the skirt 36 of the piston body 22 during operation of the engine to seal combustion gasses in the combustion chamber on one side of the piston body 22 and to seal oil on the other side of the piston body 22, e.g. in a crank case (not shown) or any other oil chamber. During operation of the engine, the piston body 22 moves up and down within the cylinder wall 24 between a top dead center position shown in FIG. 2 and a bottom dead center position shown in FIG. 3. As shown, the exemplary piston ring 20 remains in sealing engagement with the circumferentially continuous portion of the skirt 36 to maintain the gas and oil tight seal throughout the piston body's 22 range of travel. The location of the piston ring 20 in the channel 32 of the cylinder wall 24 allows for increased stability of the piston body 22 as it reciprocates in the cylinder of the engine without compromising the length of the skirt 36, i.e. the skirt 36 may extend downwardly into the crank case (not shown) when the piston body 22 is in the bottom dead center position.

Figure 4:
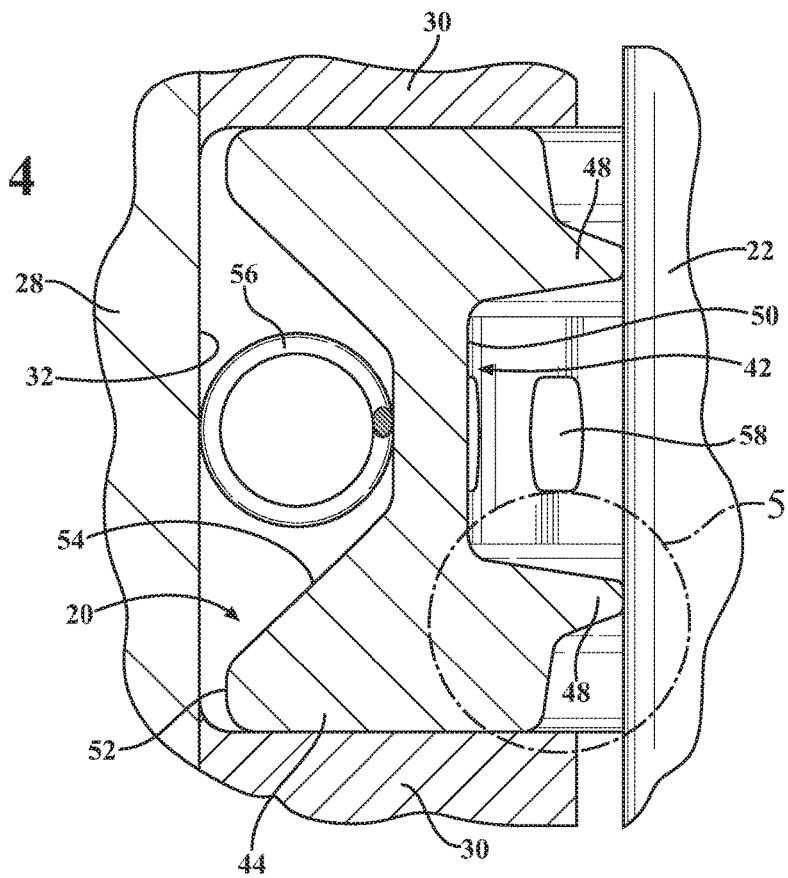
FIG. 4 is a cross-sectional and fragmentary view showing the piston ring of FIG. 1 disposed within a channel of a cylinder wall and in sealing engagement with a piston body.
Figure 5:
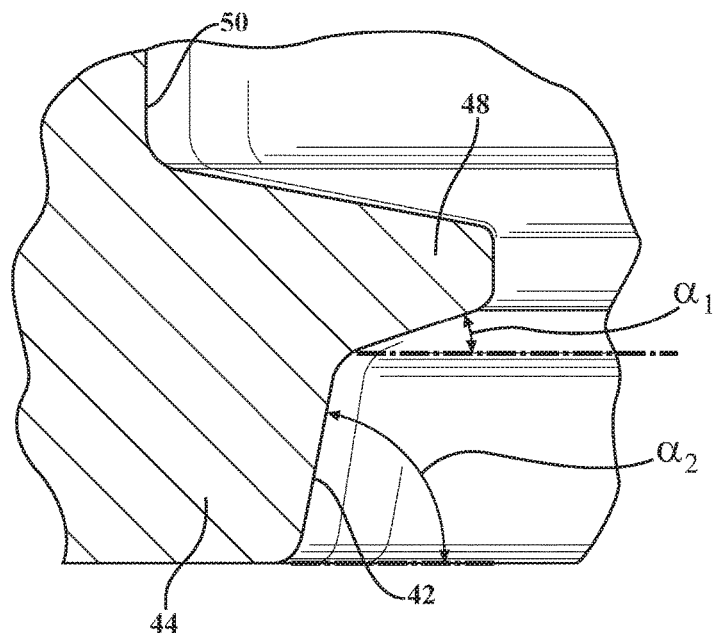
FIG. 5 is a cross-sectional and enlarged view showing a portion of the piston ring of FIG. 1.

Referring back to FIG. 1, the exemplary piston ring 20 includes a ring body 44 that extends about an axis and has ends which are separated from one another by a ring gap 46. Referring now to FIG. 4, the ring body 44 has an inner face 42 with a pair of ridges 48 which are spaced axially from one another and extend in a radially inward direction. As shown, when installed in a power cylinder assembly 26, these ridges 48 directly and slidably engage the circumferentially continuous portion of the outer surface of the piston body 22 to establish the gas and oil tight seal between the cylinder wall 24 and the piston body 22. Between the ridges 48, the inner face 42 of the exemplary ring body 44 includes a generally flat valley region 50. In the exemplary embodiment, the top and bottom surfaces of the ridges 48 are angled relative to the radial direction. These surfaces may be disposed at similar or different angles relative to the radial direction. For example, in the exemplary embodiment, the surfaces of the ridges 48 nearest the valley region 50 are disposed at approximately a ten degree angle relative to the radial direction, and the surfaces of the ridges 48 (opposite of the valley region 50) furthest from the valley region 50 are disposed at an angle $\alpha_1$ (shown in FIG. 5,) of approximately twenty degrees relative to the radial direction. In the exemplary embodiment, the portions of the inner face 42 above and below the ridges 48 are also disposed at an angle $\alpha_2$ (shown in FIG. 5, relative to the radial direction by approximately eighty degrees. It should be appreciated that these surfaces could be disposed at any suitable angles relative to the radial or axial direction and could have any suitable dimensions. Additionally, in the exemplary embodiment, the intersections of the various surfaces of the inner face 42 are rounded or radiused. However, it should be appreciated that these intersections could alternately be sharp, i.e. non-rounded.

Referring still to FIG. 4, the side of the ring body 44 opposite of the inner face 42 is an outer face 52 which presents a generally V-shaped groove 54. The piston ring 20 includes a coil spring 56 which is seated in the groove 54 and substantially circumferentially surrounds the ring body 44. The coil spring 56 exerts a biasing force against the ring body 44 to bias the ridges 48 of the inner face 42 against the outer surface of the piston body 22 and establish the aforementioned gas and oil tight seal between the cylinder wall 24 and the piston body 22.

Figure 6:
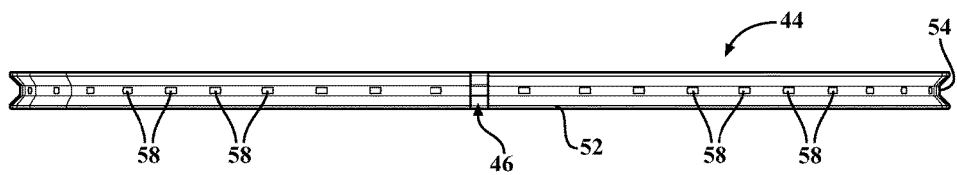
FIG. 6 is a front elevation view of a ring body of the piston ring of FIG. 1.
Figure 7:
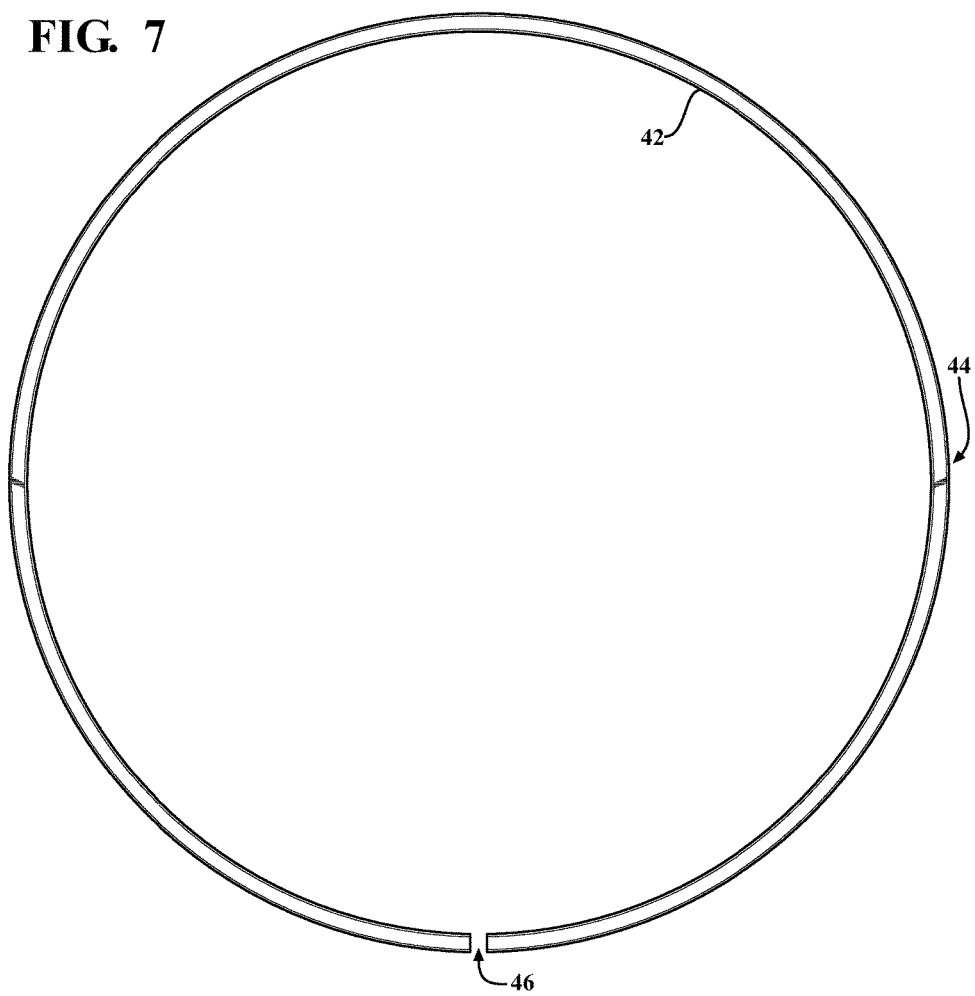
FIG. 7 is a top elevation view of the ring body of the piston ring of FIG. 1.

Referring now to FIG. 6, the ring body 44 of the exemplary piston ring 20 includes a plurality of oil drainage ports 58 which are spaced circumferentially from one another along the length of the ring body 44. As shown in FIG. 4, the oil drainage ports 58 extend radially between the inner and outer faces 42, 52 of the ring body 44 for conveying oil out of the space between the ridges 48. Specifically, the oil drainage ports 58 extend radially between the valley portion of the inner face 42 and the groove 54 of the outer face 52. The spaces between the coils of the coil spring 56 allow the oil to flow through the oil drainage ports 58 from the space between the ridges 48 to the other side of the ring body 44. The oil may then drain back to the crank case or the oil chamber below the piston body 22 during upward strokes of the piston body 22.

The ring body 44 may be formed through any desirable manufacturing process and may be of any desirable material including, for example, cast iron or steel. The ring body 44 may also either be uncoated or may have a wear resistant coating (such as chromium, chromium with aluminum oxide ceramic [CKS], chromium with microdiamond [GDC], etc.) applied to at least its inner face 42.

The exemplary description of the embodiment is meant to be illustrative and not limiting of the invention. Variations and modifications to the disclosed embodiment may become apparent to those skilled in the art and come within the scope of the invention.

What is claimed is:
1. A power cylinder assembly, comprising:
a cylinder wall having a channel formed therein, said channel extending substantially circumferentially around said cylinder wall, and said channel having a circumferentially constant and U-shaped cross-sectional shape which opens inwardly in a radial direction and is free of other openings;
a piston body having a skirt and wherein at least a portion of an outer surface of said skirt extends continuously around a circumference;

a piston ring disposed in said channel of said cylinder wall;

said piston ring having a ring body that is made of a monolithic piece of metal and that extends about an axis and has an inner face and an outer face, said inner face having only ridges that extend in the radial direction, said ridges being spaced from one another by a valley region, said outer face presenting a groove, and said ring body having a planar top surface and a planar bottom surface along a full distance between opposite gap faces that are separated from one another by a ring gap;

said piston ring further including a spring substantially circumferentially surrounding said ring body and seated in said groove on said outer face, said spring biasing said ring body inwardly in radial direction to seal said ridges against said circumferentially continuous portion of said skirt of said piston body, and said spring being a coil spring;

said ring body having at least one oil drainage port extending in the radial direction between said valley region of said inner face and said groove of said outer face for conveying oil from between said ridges to said groove;

wherein said ridges of said ring body have respective first surfaces that face away from said valley region, each first surface extending at a first angle relative to the radial direction; and wherein said inner face of said ring body further includes second surfaces, wherein each second surface extends from one of said first surfaces to a respective one of said planar top and bottom surfaces, and wherein each second surface is angled relative to the radial direction at a second angle that is greater than zero degrees and is greater than said first angle and wherein said second angle is approximately eighty degrees.

2. The power cylinder assembly as set forth in claim 1 wherein said at least one oil drainage port in said ring body is further defined as a plurality of oil drainage ports spaced circumferentially from one another.

3. The power cylinder assembly as set forth in claim 1 wherein said ring body is uncoated.

4. The power cylinder assembly as set forth in claim 1 wherein said ring body is of cast iron or steel.

* * * * *